US009436814B2

(12) United States Patent
Kruglick (10) Patent No.: US 9,436,814 B2
(45) Date of Patent: Sep. 6, 2016

(54) FAIL-SAFE LICENSING FOR SOFTWARE APPLICATIONS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/426,157

(22) PCT Filed: Jan. 22, 2013

(86) PCT No.: PCT/US2013/022516
§ 371 (c)(1),
(2) Date: Mar. 4, 2015

(87) PCT Pub. No.: WO2014/116201
PCT Pub. Date: Jul. 31, 2014

(65) Prior Publication Data
US 2015/0213237 A1    Jul. 30, 2015

(51) Int. Cl.
*G06F 21/10*    (2013.01)
*G06F 21/12*    (2013.01)

(52) U.S. Cl.
CPC ........... *G06F 21/105* (2013.01); *G06F 21/121* (2013.01); *G06F 2221/0775* (2013.01)

(58) Field of Classification Search
None
See application file for complete search history.

(56) References Cited

U.S. PATENT DOCUMENTS

| 5,845,065 | A | 12/1998 | Conte et al. | |
| 6,766,305 | B1* | 7/2004 | Hoover | G06F 21/10 705/317 |
| 2001/0011253 | A1 | 8/2001 | Coley et al. | |
| 2001/0049717 | A1* | 12/2001 | Freeman | G06F 9/5027 709/203 |
| 2002/0164025 | A1* | 11/2002 | Raiz | G06F 21/10 380/231 |
| 2005/0268290 | A1 | 12/2005 | Cognigni et al. | |
| 2006/0004591 | A1* | 1/2006 | Johnson | G06Q 10/0831 705/331 |
| 2006/0004667 | A1 | 1/2006 | Neil | |
| 2007/0067433 | A1 | 3/2007 | D'Alterio et al. | |

(Continued)

OTHER PUBLICATIONS

"A VMM-Based Intrusion Detection System," accessed at http://www.ideaconnection.com/patents/12055-A-VMM-Based-Intrusion-Detection-System.html, accessed on Feb. 26, 2015, p. 1.

(Continued)

*Primary Examiner* — David Pearson
(74) *Attorney, Agent, or Firm* — Turk IP Law, LLC (57) ABSTRACT

Technologies are generally described to provide a fail-safe licensing system. An example system may include a quorum detection module of an instance of a software program configured to query a licensing queue corresponding to the software program for messages to determine a number of active instances of the software program. Based on a comparison of the determined number of active instances and a maximum number of allowed instances of the software program, the quorum detection module may be configured to determine whether the instance of the software program is authorized. In response to a determination that the instance of the software program is authorized, the quorum detection module may generate a unique instance identification tag and post a message to the licensing queue, where the message includes an indication that the instance of the software program is active and an indication of the generated unique instance identification tag.

20 Claims, 4 Drawing Sheets

(56) References Cited

U.S. PATENT DOCUMENTS

| | | | |
|---|---|---|---|
| 2007/0265976 A1* | 11/2007 | Helfer | G06F 21/10 705/59 |
| 2008/0028218 A1 | 1/2008 | Simon | |
| 2008/0098465 A1 | 4/2008 | Ramakrishna et al. | |
| 2009/0193496 A1 | 7/2009 | Lakshminarayanan et al. | |
| 2009/0249329 A1 | 10/2009 | Dash | |
| 2009/0313665 A1* | 12/2009 | Rouse | H04N 7/1675 725/93 |
| 2009/0328056 A1 | 12/2009 | McCune et al. | |
| 2009/0328225 A1* | 12/2009 | Chambers | G06F 21/10 726/26 |
| 2010/0205303 A1 | 8/2010 | Chaturvedi et al. | |
| 2011/0047624 A1 | 2/2011 | Vedantam et al. | |
| 2011/0072431 A1 | 3/2011 | Cable et al. | |
| 2012/0030673 A1 | 2/2012 | Sakamoto | |
| 2012/0110571 A1 | 5/2012 | Smith et al. | |
| 2012/0131578 A1 | 5/2012 | Ciano et al. | |
| 2012/0159648 A1 | 6/2012 | Park | |

OTHER PUBLICATIONS

"About Lcensing: Lcensing for Virtual Envronments," accessed at htp:/web.achive.org/web/20130120143143/http://www.microsoft.com/licensing/about-licensing/virtualization.aspx, accessed on Feb. 26, 2015, pp. 2.

"Address space layout randomization," accessed at http://web.archive.org/web/20121221090929/http://en.wikipedia.org/wiki/Address_Space_Layout_Pandomization, last modified on Dec. 17, 2012, pp. 7 .

"Amazon Simple Queue Service: Developer Guide," accessed at http://web.archive.org/web/20121111093159/http://docs.amazonwebservices.com/AWSSimpleQueueService/2008-01-01/SQSDeveloperGuide/, posted on Jan. 1, 2008, pp. 1-2.

"Are GUID collisions possible?," accessed at https://web.archive.org/web/20111101173846/http://stackoverflow.com/questions/184869/are-guid-collisions-possible, accessed on Feb. 26, 2015, pp. 5.

"Boto: A Python interface to Amazon Web Services," accessed athttp://web.archive.org/web/20110930030753/http://boto.cloudhackers.com/, accessed on Mar. 2, 2015, pp. 2.

"CHANCE News 2.21," accessed at https://web.archive.org/web/20121225064420/http://www.dartmouth.edu/~chance/chance_news/recent_news/chance_news_2.21.html, posted on Dec. 12-31, 1993, pp. 10.

"FlexNet Manager Suite for Enterprises: Complete Desktop-to-Datacenter Enterprise License Optimization Solution,"Flexera Software Datasheet, pp. 1-6 (Feb. 2012).

"Hash Collision Probabilities," accessed at https://web.archive.org/web/20130115124205/http://preshing.com/20110504/hash-collision-probabilities, posted on May 4, 2011, pp. 6.

"How a redundant license server setup works," accessed at http://www-01.ibm.com/support/docview.wss?uid=swg21394388, accessed on Feb. 26, 2015, pp. 1-2.

"How to: License Microsoft Windows Server in a VMware environment—Part 1," accessed at https://web.archive.org/web/20130117091359/http://www.vmguru.nl/wordpress/2010/04/how-to-license-microsoft-windows-server-in-a-vmware-environment-%E2%80%93-part-1/, accessed on Feb. 26, 2015, pp. 11.

"Linux 2 6 32," accessed at https://web.archive.org/web/20130116200223/http://kernelnewbies.org/Linux_2_6_32, released on Dec. 3, 2009, pp. 14.

"Monetize and Protect Your IP with Flexible Software Licensing—On-Premises, SaaS/Cloud and Virtualized," accessed at http://webarchive.org/web/20121103231531/http://www.flexerasoftware.com/products/flexnet-publisher.htm, accessed on Mar. 2, 2015, pp. 1-2.

"Processor Value Unit [PVU] licensing for Distributed Software," accessed at http://web.archive.org/web/20150107211152/http://www-01.ibm.com/software/passportadvantage/pvulicensing_for_customers.html, accessed on Feb. 26, 2015, pp. 4.

"Tivoli License Compliance Manager," accessed at http://web.archive.org/web/20121122043006/http://www-01.ibm.com/software/tivoli/products/license-mgr/, accessed on Feb. 27, 2015, pp. 1-2.

"Universally unique identifier," accessed at https://web.archive.org/web120121224042415/http://en.wikipedia.org/wiki/Universally_Unique_Identifier, last modified on Dec. 16, 2012, pp. 8.

"What is Amazon EC2?"accessed at http://web.archive.org/web20130116015527/http://docs.aws.amazon.com/AWSEC2/latest/UserGuide/concepts.html, accessed on Feb. 26, 2015, pp. 4.

Bodik, P., et al., "Fingerprinting the datacenter: automated classification of performance crises," Proceedings of the 5th European conference on Computer systems, pp. 111-124 (2010).

Chanaka, E., "Microsoft Server Licensing Implications with VMotion," accessed at https://communities.vmware.com/groups/licensing/blog/2012/01/06/microsoft-server-licensing-implications-with-vmotion, posted on Jan. 6, 2012, pp. 1-8.

Collberg, C.S., et al., "Dynarnic graph-based software fingerprinting," ACM Transactions on Programming Languages and Systems, vol. 29, No. 6, pp. 1-67 (Oct. 2007)

Corbet, J., "KSM tries again," accessed at http://web.archive.org/web/20130106152007/http://lwn.net/Articles/330589/, posted on Apr. 29, 2009, pp. 1-6.

Corbet, J., "ksm, dynamic memory sharing," accessed at http://web.archive.org/web/20130106151956/http://lwn.net/Articles/306704/, posted on Nov. 12, 2008, pp. 1-6.

Epping, D., "License server VM down, now what?," accessed at https://web.archive.org/web/20121010092046/http://www.yellow-bricks.com/2009/05/10/license-server-vm-down-now-what/, Posted on May 10, 2009, pp. 3.

Geer, D., "Reducing the Storage Burden via Data Deduplication," IEEE Computer Society, vol. 41, No. 12, pp. 15-17 (Dec. 2008).

International Search Report and Written Opinion for counterpart International Patent Application No. PCT/US13/22516 mailed Mar. 29, 2013.

Jacobson, E.R., et al., "Labeling Library Functions in Stripped Binaries," Proceedings of the 10th ACM SIGPLAN SIGSOFT workshop on Program analysis for software tools, pp. 1-8 (Sep. 2011).

Tatsubori M., et al., "A Bytecode Translator for Distributed Executon of"Legacy" Java Sofware," ECOOP 2001—Object-Oriented Programming Lecture Notes in Computer Science, vol. 2072, pp. 236-255 (Jun. 21, 2001).

Vijayan, J., "IBM drops mainframe license manager tool," accessed at http://www.computerworld.com/ article/2578067/operating-systems/ibm-drops-mainfrarne-license-manager-tool.html, posted an Dec. 9, 2005, pp. 1-5.

Wood, T., et al., "Memory buddies: exploiting p. sharing for smart colocation in virtualized data centers," Proceedings of the 2009 ACM SIGPLAN/SIGOPS international conference on Virtual execution environments, pp. 31-40 (2009).

Yin, Z., et al., "Fingerprinting Executable Programs Based on Color Moments of a Novel Abstract Call Graph," Proceedings of the 2008 the 9th International Conference for Young Computer Scientists, pp. 2319-2324 (Nov. 18-21, 2008).

* cited by examiner

300 A computer program product

302 A signal bearing medium 304
machine-readable instructions, which, when executed by one or more processors, operatively enable a quorum detection module of an instance of a software program to:

query a licensing queue corresponding to the software program for messages;
receive a result based at least in part on the querying of the licensing queue;
determine a number of active instances of the software program based at least in part on the received result;
determine whether the instance of the software program is authorized based at least in part on the determined number of active instances;
generate a unique instance identification tag in response to determination that the instance of the software program is authorized;
post a message to the licensing queue, in response to determination that the instance of the software program is authorized, the message including an indication that the instance of the software program is active and an indication of the generated unique instance identification tag; or
terminate execution of the instance of the software program in response to determination that the instance of the software program is unauthorized.

| 306 a computer-readable medium | 308 a recordable medium | 310 a communications medium |
|---|---|---|

FAIL-SAFE LICENSING FOR SOFTWARE APPLICATIONS

CROSS-REFERENCE TO RELATED APPLICATION

This Application is the U.S. National Stage filing under 35 U.S.C §371 of PCT Application Ser. No. PCT/US13/22516 filed on Jan. 22, 2013. The PCT Application is herein incorporated by reference in its entirety.

BACKGROUND

Unless otherwise indicated herein, the approaches described in this section are not prior art to the claims in this application and are not admitted to be prior art by inclusion in this section.

With modern computing applications, simultaneous execution of multiple instances of a software application may occur. For example, a virtual machine may be configured to include an installation of a software application. This virtual machine may be copied and launched any number of times simultaneously. Each running copy of the virtual machine may then execute an instance of the software application.

Managing licensing of a software application may typically involve a licensing server. For example, each instance of the software application may, upon launch, contact the licensing server for authorization to run. If authorization is not received, the instance of the software application may fail to run. For example, if the maximum number of allowed instances are already executing, the licensing server may not provide authorization for any new instances. As such, new instances may fail to launch. However, if the licensing server becomes unavailable, new instances of the software application may fail to launch, even where available licenses technically exist.

Additionally, a licensing server may require periodic "check in" by each executing instance of the software application. For example, some software applications may be licensed based on various computing metrics (e.g., processor core usage, memory usage, or the like). A periodic check in by each executing instance of the software application may be used to determine current usage and enforce the licensing requirements. Accordingly, at each check in by an instance of the software application, authorization may be verified. If authorization is verified, the instance may continue to execute. If authorization is not verified, the instance may shut down. However, if the licensing server goes down, all executing copies of the software application may eventually fail. That is, when each instance tries to check in, authorization may not be verified due to the licensing server being unavailable. As such, the entire deployment of executing instances may eventually shut down.

SUMMARY

Detailed herein are various illustrative methods for managing licensing of a software program. Example methods may include querying, by an instance of the software program, a licensing queue, wherein the licensing queue includes an indication of a number of active instances of the software program, determining, by the instance of the software program, whether the instance of the software program is authorized based at least in part upon the querying of the licensing queue, and updating, by the instance of the software program, the licensing queue in response to determination that the instance of the software program is authorized.

Some alternative or additional example methods may include querying, by an instance of the software program, a licensing queue for messages, receiving, by the instance of the software program, a result based at least in part on the querying of the licensing queue, determining, by the instance of the software program, a number of active instances of the software program based at least in part on the received result, determining, by the instance of the software program, whether the instance of the software program is authorized based at least in part on the determined number of active instances, generating, by the instance of the software program, a unique instance identification tag in response to determination that the instance of the software program is authorized, and posting, by the instance of the software program, a message to the licensing queue, in response to determination that the instance of the software program is authorized, the message including an indication that the instance of the software program is active and an indication of the generated unique instance identification tag.

The present disclosure also describes various example machine-readable non-transitory storage medium having stored therein instructions that, when executed, operatively enable a quorum detection module of an instance of a software program to query a licensing queue corresponding to the software program for messages, receive a result based at least in part on the querying of the licensing queue, determine a number of active instances of the software program based at least in part on the received result, determine whether the instance of the software program is authorized based at least in part on the determined number of active instances, generate a unique instance identification tag in response to determination that the instance of the software program is authorized, and post a message to the licensing queue, in response to determination that the instance of the software program is authorized, the message including an indication that the instance of the software program is active and an indication of the generated unique instance identification tag.

The present disclosure additionally describes example systems for managing licensing of a software program. Example systems may include an instance of a software program, a licensing queue corresponding to the software program, and a quorum detection module coupled to the software program, the quorum detection module operatively enabled to query a licensing queue for messages, receive a result based at least in part on the querying of the licensing queue, determine a number of active instances of the software program based at least in part on the result, determine whether the instance of the software program is authorized based at least in part on the determined number of active instances, generate a unique instance identification tag in response to determination that the instance of the software program is authorized, and post a message to the licensing queue, in response to determination that the instance of the software program is authorized, the message including an indication that the instance of the software program is active and an indication of the generated unique instance identification tag.

The foregoing summary is illustrative only and not intended to be in any way limiting. In addition to the illustrative aspects, embodiments, and features described above, further aspects, embodiments, and features will become apparent by reference to the drawings and the following detailed description, which are also illustrative only and not intended to be limiting.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings.

DETAILED DESCRIPTION

The following description sets forth various examples along with specific details to provide a thorough understanding of the present disclosure. The various embodiments may be practiced without some or more of the specific details disclosed herein. Further, in some circumstances, well-known methods, procedures, systems, components and/or circuits have not been described in detail, for the sake of brevity and clarity.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, devices, systems and computer readable media related to providing fail-safe licensing for a software program.

In general, technologies are described that provide a fail-safe licensing system. The fail-safe licensing system of at least some embodiments may detect whether too many licenses are in use without the need for a particular licensing server to be in operation.

Briefly, an instance of a software application/program in at least some embodiments may use a messaging queue to observe overall usage of the software application (e.g., other execution instances). Each instance of the software application may be configured to "self-police" itself. That is, each instance of the software application may be configured to run unless more usage is observed (e.g., determined) than is allowed. In which case, the instance of the software application that observed the excess usage may shut itself down. As one example, running instances of the software application may periodically post "messages" to the messaging queue. Each message may indicate that the instance of the software application that posted the message is active. Any particular instance of the software application may then retrieve messages from the messaging queue. The particular instance of the software application may then determine the total number of active instances of the software application, based at least in part upon reading the messages. The particular instance of the software application may compare the determined number of active instances against a known limit of active instances. If the particular instance of the software application observes more instances running than are allowed by the limit, that particular instance may shut itself down.

The above example (as well as other examples provided throughout this disclosure) is given for illustration only. However, it shows that licensing of a software application may be configured to include some fail-safe measures. As used herein, "fail-safe" and/or "fail-safe licensing" and/or other possible variations thereof may refer to an instance of a software application configured to substantially recover (e.g., continue execution) despite a failure in the licensing system. For example, upon or after launch (or at a periodic check in), an instance of the software application may query a messaging queue (e.g., including retrieving message(s) from the messaging queue.) The instance of the software application may then, based at least in part upon the querying of the messaging queue, observe (e.g., determine) the total number of other instances of the software application that are active. However, the instance of the software application may be configured to run, unless more active instances are observed than are allowed. Accordingly, if the instance of the software application cannot retrieve messages from the messaging queue (e.g., the messaging queue is unavailable, a communication error occurs between the messaging queue and the instance, or the like), the instance of the software application may still execute. As such, a single point of failure (e.g., the messaging queue becoming unavailable) may not cause execution of the instance of the software application to cease. Contrast this with conventional licensing systems where a single licensing server is active and reachable on the network at any given time or else execution of active instance of a software application may eventually fail.

Figure 1:
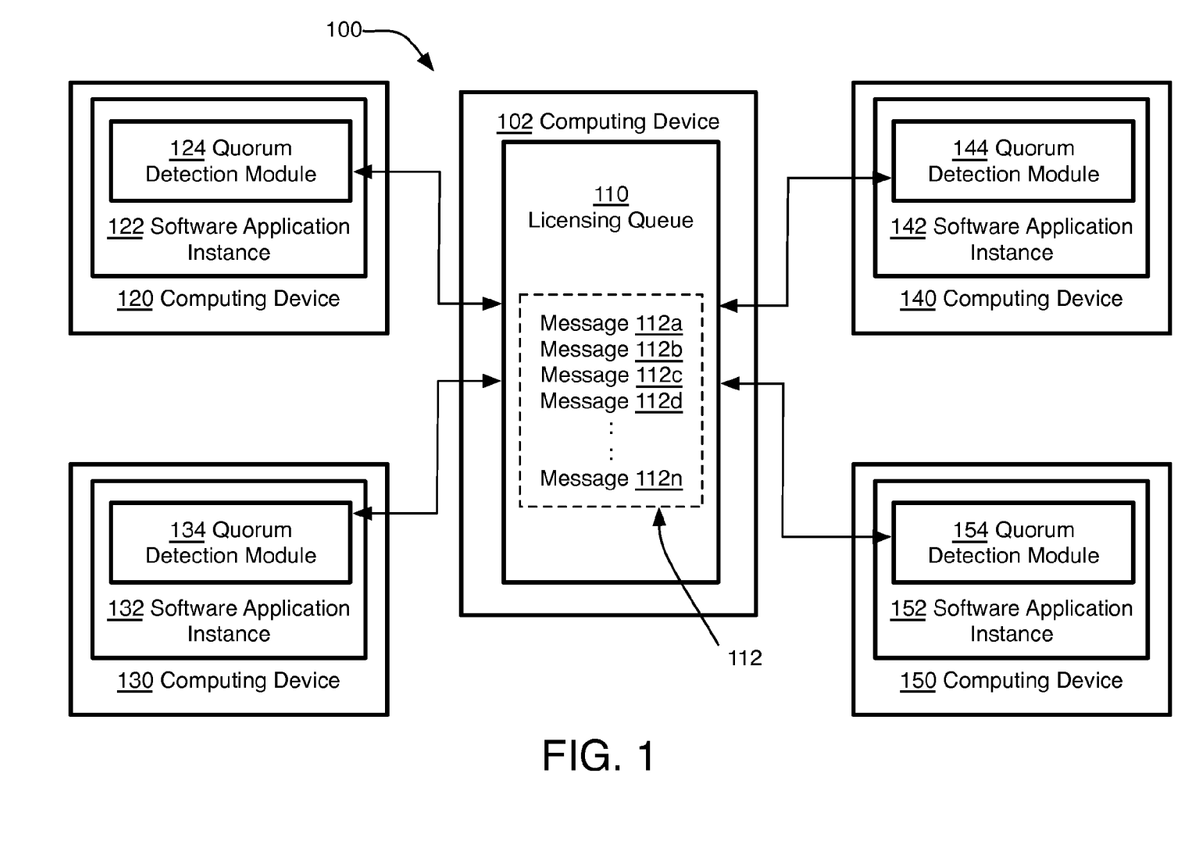
FIG. 1 illustrates a block diagram of an example system for providing fail-safe licensing for a software application.

FIG. 1 illustrates a block diagram of an example system for providing fail-safe licensing for a software application, arranged in accordance with at least some embodiments of the present disclosure.

As depicted, the system 100 may include a number of computing devices. The system 100 is shown including computing devices 102, 120, 130, 140, and 150. The computing devices (e.g., the computing device 102, 120, 130, 140, and/or 150) may include a virtual machine, a server, a desktop computer, a workstation, a laptop computer, some other computing device that includes hardware, and/or any combination thereof. The computing devices (e.g., the computing device 102, 120, 130, 140, and/or 150) may also include a smart phone, a tablet computer, or any other device capable of executing a software application. In some embodiments, the type of computing devices need not be the same. For example, the computing device 102 may be a server, the computing device 120 may be a workstation, the computing device 130 may be a virtual machine executing on the workstation, the computing device 140 may be another workstation and the computing device 150 may be a laptop computer. In some embodiments, one or more of the computing devices may correspond to substantially the same computing hardware. For example, if the computing devices (e.g., the computing device 102, 120, 130, 140, and/or 150) were virtual machines executing on a server, these virtual machines may execute upon the same server.

The computing device 102 may be configured to execute a licensing queue 110. In general, the licensing queue 110 may be any type of queue with which messages 112 (e.g., the messages the message 112*a*, 112*b*, 112*c*, or 112*d*, up to a message 112*n*) may be posted and/or retrieved. For example, the computing device 102 may be communicatively coupled (e.g., via the Internet, via a wireless communication link, via a wired communication link, and/or the like) to the other computing devices (e.g., the computing device 120, 130, 140, and/or 150) in the system 100. Accordingly, the licensing queue 110 may be configured to facilitate message traffic between these computing devices. In some examples, the licensing queue 110 may be implemented using a message queuing protocol (e.g., the advanced message queuing protocol, the message queue telemetry transport protocol, the streaming text oriented messaging protocol, and/or the like). In some examples, a cloud computing service may provide the licensing queue 110.

For example, some cloud computing services may include the ability to establish and/or use a queue. As such, a queue provided by a cloud computing queuing may be used to implement the licensing queue 110. The provided queue may behave like a temporary repository for the messages 112. Messages 112 may be posted to the provided queue (e.g., using an API provided by the cloud computing queuing service provider, or the like) by the other computing devices in the system 100 (e.g., the computing device 120, 130, 140, and/or 150). In further examples, the same cloud computing service may be used to implement the computing devices 120, 130, 140, and/or 150.

In some embodiments, the computing device 102, in addition to executing or otherwise maintaining the licensing queue 110 for all of the other computing devices, may itself be configured as one of the computing devices that is allowed to execute a software program which is tracked by the licensing queue 110. For instance, the computing device 102 in such embodiment(s) may be a work station, laptop, etc. that is licensed to execute the software program, in which case the computing device 102 may conduct internal queries to the licensing queue 110 that it maintains in order to verify license availability for its software program, as well as receiving queries from other computing devices directed towards the licensing queue 110.

Each of the other computing devices in the system 100 may be configured to execute at least one instance of a software application. For example, the computing devices 120, 130, 140, and 150 are shown configured with respective software application instances 122, 132, 142, and 152. In some embodiments of the present disclosure, a computing device (e.g., the computing device 120, 130, 140, and/or 150) may execute more than one instance of the software application. However, this is not shown in FIG. 1 for clarity of presentation. Each software application instance may include a quorum detection module. The software application instances 122, 132, 142, and 152 are shown including respective quorum detection modules 124, 134, 144, and 154.

In general, each quorum detection module of some embodiments may be configured to facilitate fail-safe licensing of its corresponding software application instance, as described above. Although, any one of the quorum detection modules (e.g., the quorum detection module 124, 134, 144, and/or 154) may be configured to facilitate fail-safe licensing as described above, FIG. 1 is further described below from the perspective of the quorum detection module 124 for ease of description. This is not intended to be limiting and any other quorum detection module within the system 100 (e.g., the quorum detection module 134, 144, and/or 154) may be substituted for the quorum detection module 124 in the following description.

As stated above, in order to provide fail-safe licensing, the quorum detection module 124 may be configured to determine the number of software application instances (e.g., the software application instances 122, 132, 142, and/or 152) in the system 100 that are actively executing. In general, the quorum detection module 124 may determine the number of active software application instances in the system 100 based at least in part upon communicating with the licensing queue 110. In general, the quorum detection module 124 may communicate with the licensing queue 110 by posting, querying, reading, and/or otherwise communicating with the licensing queue 110 via the Internet, a wired communication link, a datacenter network link, a wireless communication link, and/or any suitable communication link that may exist or be established between the computing device 120 and the computing device 102. For example, the computing device 120 and 102 may be implemented as part of the same LAN. Accordingly, the quorum detection module 124 may communicate with the licensing queue via a wired and/or wireless LAN connection. As another example, the computing device 102 may be implemented in a cloud-computing environment. As such, the quorum detection module 124 may communicate with licensing queue 110 via an Internet connection.

In order to facilitate determination of the number of actively executing software application instances in the system 100 by the quorum detection module 124, each of the quorum detection modules 124 134, 144, and/or 154 may be configured to update the licensing queue 110 to represent that their corresponding software application instance (e.g., the software application instance 122, 132, 142, and/or 152) is actively executing.

In some examples, each of the quorum detection modules 124, 134, 144, and/or 154 may be configured to update the licensing queue 110 by posting one or more of the messages 112 (e.g., the message 112*a*, 112*b*, 112*c*, or 112*d*, up to a message 112*n*) to the licensing queue 110, via a communication link to the computing device 102. As such, each of the messages 112 (e.g., the message 112*a*, 112*b*, 112*c*, and/or 112*d*) may include an indication of the status of a particular software application instance in the system 100 (e.g., the software application instance 122, 132, 142, and/or 152). For example, the message 112*a* may include an indication that the software application instance 132 is actively executing. In some examples, two or more of the messages 112 (e.g., the message 112*a*, 112*b*, 112*c*, and/or 112*d*) may include an indication of the status of the same software application instance. For example, the messages 112*a* and 112*b* may include an indication that the software application instance 132 is actively executing. In some examples, the messages 112 (e.g., the message 112*a*, 112*b*, 112*c*, and/or 112*d*) may include a Universally Unique Identifier (UUID) corresponding to a particular software application instance in the system 100. In some examples, the messages 112 (e.g., the message 112*a*, 112*b*, 112*c*, and/or 112*d*) may be SMS messages, a proprietary messaging format, or any communication and/or data storable in the licensing queue 110.

The quorum detection module 124 may be configured to determine the number of software application instances in the system 100 (e.g., the software application instance 122, 132, 142, and/or 152) that are actively executing from the licensing queue 110. In general, the quorum detection module may be configured to query and/or read the licensing queue 110. More particularly, the quorum detection module 124 may query the licensing queue 110 in order to read the messages 112 (e.g., the message 112a, 112b, 112c, and/or 112d). The quorum detection module 124 may then determine the number of the software application instances (e.g., the software application instance 122, 132, 142, and/or 152) in the system 100 that are currently executing based at least in part upon the reading of the messages 112. Additionally, the quorum detection module 124 may compare the determined number of currently executing software application instances to a limit of simultaneously executing software application instances. The quorum detection module 124 may then determine whether the software application instance 122 is authorized, based at least in part upon the comparison. Furthermore, the quorum detection module 124 may cause the software application instance 122 to shut down, based at least in part upon determining whether execution of the software application instance 122 is authorized. For example, the quorum detection module 124 may cause the software application instance 122 to shut down if the determined number of actively executing software application instances is greater than the allowed limit.

In some examples, a quorum detection module (e.g., the quorum detection module 124, 134, 144, or 154) may post one of the messages 112 (e.g., the message 112a, 112b, 112c, or 112d) to the licensing queue 110 only upon or at some amount of time after initial startup of its corresponding software application instance (e.g., the software application instance 122, 132, 142, or 152). This example may be implemented where licensing is based on the total number of active instances and/or where periodic check-in is not used. In alternative or additional examples that use some type of check-in procedure, a quorum detection module (e.g., the quorum detection module 124, 134, 144, or 154) may repeatedly (e.g., at set or random intervals during execution, at set or random time intervals, or the like) post one of the messages 112 (e.g., the message 112a, 112b, 112c, and/or 112d) to the licensing queue 110. In some examples, the messages 112 (e.g., the messages 112a, 112b, 112c, and/or 112d) may include a time stamp.

In general, the system 100 may be deployed within a single site, at multiple sites networked together, at a data-center(s), in a cloud-computing environment(s), or in any configuration where the computing devices may connect or otherwise communicate with the licensing queue to facilitate posting and reading of messages by the quorum detections modules.

Figure 2:
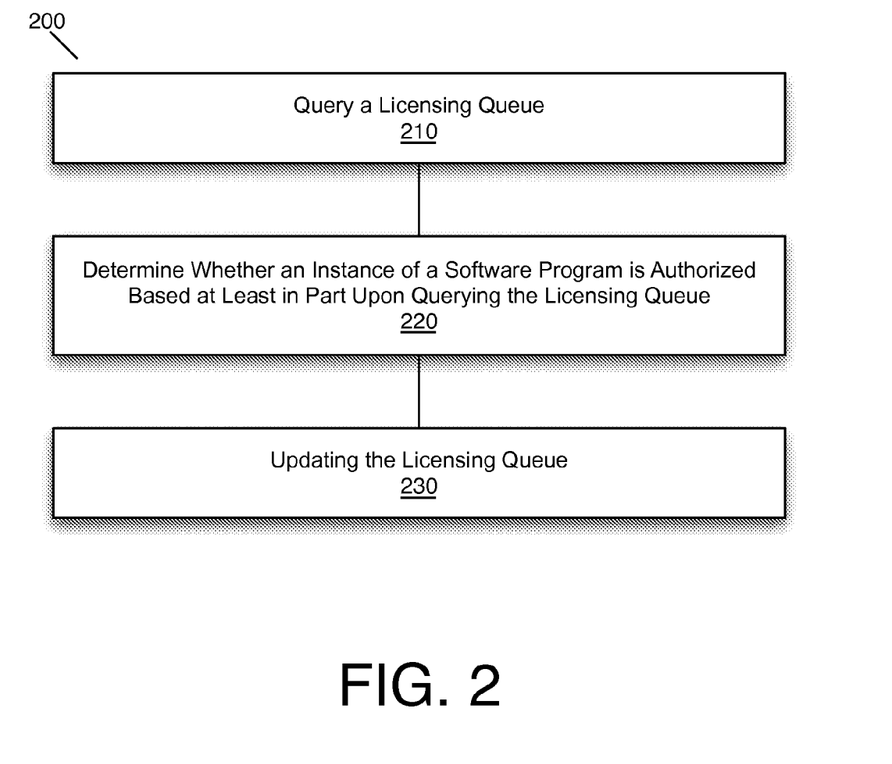
FIG. 2 illustrates a flow chart of an example method for providing fail-safe licensing for a software application.

FIG. 2 illustrates a flow chart of an example method 200 for providing fail-safe licensing of a software application, arranged in accordance with at least some embodiments of the present disclosure. This figure employs block diagrams to illustrate the example methods detailed therein. These block diagrams may set out various functional blocks or actions that may be described as processing steps, functional operations, events and/or acts, etc., and may be performed by hardware, software, firmware, and/or combination thereof, and need not necessarily be performed in the exact order shown. Numerous alternatives or additions to the functional blocks detailed (and/or combinations thereof) may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described and other rearrangements, substitutions, changes, modifications, etc., may be made without departing from the scope of claimed subject matter.

Additionally, FIG. 2 is described with reference to elements of the system 100 depicted in FIG. 1. However, the described embodiments are not limited to this depiction. More specifically, some elements depicted in FIG. 1 may be omitted from example implementations of the methods detailed herein. Additionally, other elements not depicted in FIG. 1 may be used to implement example methods.

Turning now to the method 200 and FIG. 2, briefly stated, the method 200 may be carried out by any one of the quorum detection modules within the system 100. Although any one of the quorum detection modules may carry out the method 200, illustrative examples are provided, which reference the quorum detection module 124 carrying out the method, for the sake of ease of explanation. However, this distinction is not intended to be limiting and any other quorum detection module within the system 100 may be substituted for the quorum detection module 124 in the following description.

Beginning at block 210, "Query a Licensing Queue", the quorum detection module 124 may include logic and/or features configured to query the licensing queue 110. In general, at block 210, the quorum detection module 124 may read messages 112 (e.g., the messages 112a, 112b, 112c, and/or 112d) from the licensing queue 110. Continuing from block 210 to block 220, "Determine Whether an Instance of a Software Program is Authorized Based at Least in Part Upon Querying the Licensing Queue", the quorum detection module 124 may include logic and/or features configured to determine whether the software application instance 122 is authorized based at least in part upon querying the licensing queue 110 (e.g., reading the messages 112).

For example, assume that the software application instance 132 is actively executing, and that the quorum detection module 134 had posted the message 112a indicating such, to the licensing queue 110. Further assume that the software application instance 142 is actively executing, and that the quorum detection module 144 had posted the message 112b indicating such, to the licensing queue 110. Under these assumptions, the quorum detection module 124 may read the messages 112a and 112b and determine, based at least in part upon reading the messages, that both the software application instances 132 and 142 were active in the system 100. Subsequently, still at block 220, the quorum detection module 124 may be configured to compare the determined usage (e.g., two instances) to an allowed usage in order to determine if the software application instance 122 is authorized. Further, assume that three simultaneous instances of the software application are authorized in the system 100. As such, the quorum detection module 124 may determine, at block 220, that the software application instance 122 is authorized. However, if for example, only two simultaneous instances of the software application are authorized in the system 100, the quorum detection module 124 may determine that the software application instance 122 is not authorized. The quorum detection module 124 may be further configured to cause the software application instance 122 to shut down or otherwise deactivate. In some examples, the software application instance 122 may be paused, put into sleep, terminated, powered off, or generally any action that prevents the software application instance 122 from violating the license. In some examples, the quorum detection module 124 may employ a timer to shut down the software application instance 122. For example, shut down may be delayed for a period of time while authorization of the software application instance 122 is repeatedly checked (e.g., by re-querying the licensing queue 110). If authorization is verified, the quorum detection module 124 may abort shut down or other deactivation. This may prevent oscillation of shut down between software application instances within the system 100 where licensing compliance is near the limit.

In some embodiments, the quorum detection module 124 may determine that the software application instance 122 is not authorized if the licensing queue 110 cannot be queried (e.g., at block 210, or the like). For example, if the licensing queue 110 does not respond to queries by the quorum detection module 124, after a specified amount of time has elapsed, the quorum detection module 124 may be configured to determine, at block 220, that the software application instance 122 is not authorized. As another example, if the licensing queue 110 does not response to a set number of queries by the quorum detection module 124, the quorum detection module 124 may be configured to determine, at block 220, that the software application instance 122 is not authorized.

In some implementations, the license terms such as the limit described herein (e.g., number of allowed instances, total allowed computing metric, or the like) may be programmed into each software application instance. In alternative or additional implementations, the quorum detection module may access the licensing terms in a location within the system 100. For example, license terms may be stored in a memory location on the system 100. In some examples, the memory location may be located on one or more of the computing devices (e.g., the computing device 102, 120, 130, 140, or 150), on a standalone memory storage device communicatively coupled to the computing devices, and/or some combination thereof. Any quorum detection module within the system 100 may then determine the licensing terms by accessing the memory locations. In some embodiments, the licensing terms may be stored in an encrypted file (e.g., in the memory location described above, or the like), which can be decrypted by the quorum detection modules.

In some embodiments, the quorum detection module 124 may be configured to repeatedly "check" or "verify" authorization as described above. For example, the quorum detection module may be configured to determine if the software application instance 122 is authorized (e.g., at blocks 210 and/or 220) upon or after initial startup of the software application instance 122. Additionally, the quorum detection module may be configured to re-determine if the software application instance 122 is authorized (e.g., by repeating blocks 210 and/or 220) periodically during execution of the software application instance.

Continuing from block 220 to block 230, "Updating the Licensing Queue", the quorum detection module 124 may include logic and/or features configured to generate a message 112 (e.g., the message 112*a*, 112*b*, 112*c*, or 112*d*) indicating that the software application instance 122 is active and post the generated message to the licensing queue 110. In some example, the quorum detection module 124 may only carry out the operation(s) at block 230 if it is determined that the software application instance 122 is authorized (e.g., at block 220). However, as described above, with some examples, the software application instance 122 may be allowed to run unless more usage is observed in the system than is allowed. Accordingly, in some embodiments, the quorum detection module 124 may carry out block 230 before blocks 210 and/or 220. That is, the quorum detection module 124 may generate and post messages 112 (e.g., the messages 112*a*, 112*b*, 112*c*, and/or 112*d*) to the licensing queue 110 upon start up and/or repeated thereafter, until the software application instance 122 is shut down (e.g., by the quorum detection module 124, by a user, or the like).

In some examples, the method described with respect to FIG. 2 and elsewhere herein may be implemented based at least in part on the following pseudo code. The following pseudo code used the python programming language and the boto library provided by AMAZON® for use with their cloud computing services.

Import any library required to connect to and/or interact with the licensing queue 110.
from boto.sqs.connection import SQSConnection
conn=SQSConnection('<aws access key>', '<aws secret key>')
import boto
Check available queues for "Licensing Queue 110" and create it if not found.
LicenseQueue=boto.conn.get_all_queues (prefix='License Queue 110')
if not(LicenseQueue): LicenseQueue= boto.conn.create_queue('licensing queue 110')
Check the licensing queue 110 for messages 112.
MessageList=LicenseQueue.get_messages( )
if len(MessageList)>1:
Iterate through MessageList and count the unique IDs for software application instances 122, 132, 142, and/or 152.
if LicenseCount>PermittedLicenses: <Enforcement Action> else <Operate and post messages to LicenseQueue at intervals># Repeatedly re-check for messages and count unique IDs.

In some examples, the quorum detection module 124 may be configured to establish the licensing queue 110. For example, if, at block 210, the quorum detection module 124 determines that the licensing queue 110 does not yet exist within the system 100, the quorum detection module 124 may establish the licensing queue 110. In some implementations, the quorum detection module 124 may prevent the software application instance 122 from executing until at least the licensing queue 110 is either discovered and/or established within the system 100. This may, for example, prevent execution of the software application instances in a system where queuing has been disabled.

With some embodiments, the messages 112 (e.g., the messages 112*a*, 112*b*, 112*c*, and/or 112*d*) may be repeatedly archived by the system 100. The archive of messages may, for example, be later used to determine billing for actual usage of the software application within the system 100.

With some embodiments, the licensing queue 110 may be associated with a vendor for the software application corresponding to the software application instance 122, 132, 142, and/or 152. As such, the software vendor may be able to observe and/or record usage of their software application (e.g., at a datacenter, used within a cloud computing service, or the like) via the messages 112 posted to the licensing queue 110. For example, the software vendor may query the messages 112 from the licensing queue 110 to determine the usage (e.g., total number of active instances, approximate execution time, unique instances, or the like) based at least in part on the messages 112.

With some embodiments, the fail-safe licensing technology described above may account for more complex licensing schemes than described above. Particularly, licensing requirements based upon processor utilization, for example, may be incorporated into the disclosed subject matter. For example, the quorum detection modules (e.g., the quorum detection modules 124, 134, 144, and/or 154) may be configured to determine the amount of processor utilization for their respective software application instances. Additionally, the quorum detection modules (e.g., the quorum detection modules 124, 134, 144, and/or 154) may be configured to generate messages 112 (e.g., the messages 112a, 112b, 112c, and/or 112d) that include an indication of the determined processor utilization. As such, when a particular quorum detection module reads the messages 112, it may observe (e.g., determine) the overall processor utilization based at least in part upon reading the messages. The particular quorum detection module may then take appropriate action to assist in compliance with the license scheme (e.g., shutting down the corresponding software application instance, reducing processor utilization of the corresponding software application instance, or the like).

In some embodiments, the method described with respect to FIG. 2 and elsewhere herein may be implemented as a computer program product, executable on any suitable computing system, or the like. For example, a computer program product for facilitating fail-safe licensing of a software application may be provided. Example computer program products are described with respect to FIG. 3 and elsewhere herein.

Figure 3:
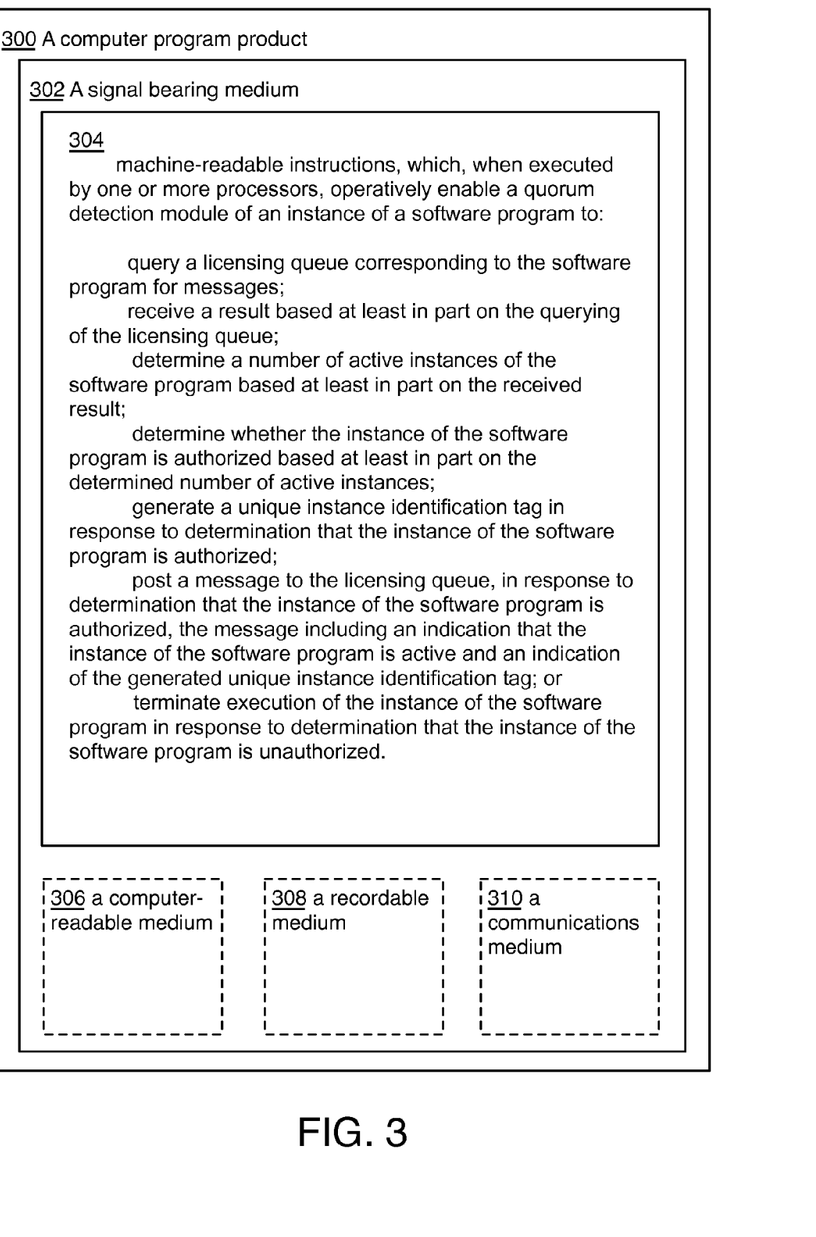
FIG. 3 illustrates an example computer program product.

FIG. 3 illustrates an example computer program product 300, arranged in accordance with at least some embodiments of the present disclosure. The computer program product 300 may include a machine-readable non-transitory medium having stored therein a plurality of instructions that, when executed, operatively enable a quorum detection module to provide fail-safe licensing of a software application according to the embodiments of the processes and methods discussed herein. The computer program product 300 of one embodiment may include a signal bearing medium 302. The signal bearing medium 302 may include one or more machine-readable instructions 304, which, when executed by one or more processors, may operatively enable a computing device to provide the functionality described herein. In various examples, the devices discussed herein may use some or all of the machine-readable instructions.

In some examples, the machine-readable instructions 304 may include querying a licensing queue corresponding to the software program for messages. In some examples, the machine-readable instructions 304 may include receiving a result based at least in part on the querying of the licensing queue. In some examples, the machine-readable instructions 304 may include determining a number of active instances of the software program based at least in part on the received result. In some examples, the machine-readable instructions 304 may include determining whether the instance of the software program is authorized based at least in part on the determined number of active instances. In some examples, the machine-readable instructions 304 may include generating a unique instance identification tag in response to determination that the instance of the software program is authorized. In some examples, the machine-readable instructions 304 may include posting a message to the licensing queue, in response to determination that the instance of the software program is authorized, the message including an indication that the instance of the software program is active and an indication of the generated unique instance identification tag. In some examples, the machine-readable instructions 304 may include terminating execution of the instance of the software program in response to determination that the instance of the software program is unauthorized.

In some implementations, signal bearing medium 302 may encompass a computer-readable medium 306, such as, but not limited to, a hard disk drive, a Compact Disc (CD), a Digital Versatile Disk (DVD), a digital tape, memory, etc. In some implementations, the signal bearing medium 302 may encompass a recordable medium 308, such as, but not limited to, memory, read/write (R/W) CDs, R/W DVDs, etc. In some implementations, the signal bearing medium 302 may encompass a communications medium 310, such as, but not limited to, a digital and/or an analog communication medium (e.g., a fiber optic cable, a waveguide, a wired communication link, a wireless communication link, etc.). In some examples, the signal bearing medium 302 may encompass a machine readable non-transitory medium.

In general, at least some embodiments of the method described with respect to FIG. 2 and elsewhere herein may be implemented in any suitable server and/or computing system. Example systems may be described with respect to FIG. 4 and elsewhere herein. In general, the computer system may be configured to provide fail-safe licensing of a software application.

Figure 4:
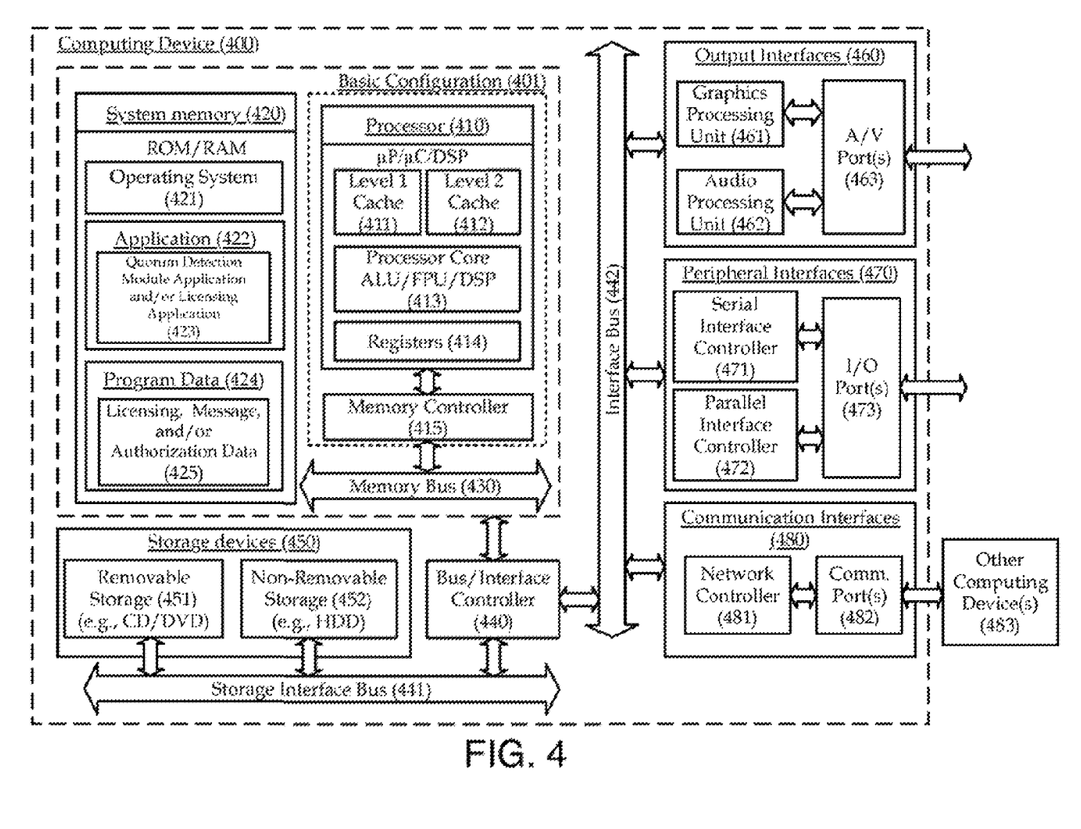
FIG. 4 illustrates a block diagram of an example computing device, all arranged in accordance with at least some embodiments of the present disclosure.

FIG. 4 is a block diagram illustrating an example computing device 400, arranged in accordance with at least some embodiments of the present disclosure. In various examples, the computing device 400 may be configured to fail-safe licensing of a software application as discussed herein. In one example of a basic configuration 401, the computing device 400 may include one or more processors 410 and a system memory 420. A memory bus 430 can be used for communicating between the one or more processors 410 and the system memory 420.

Depending on the particular configuration, the one or more processors 410 may be of any type including but not limited to a microprocessor (µP), a microcontroller (µC), a digital signal processor (DSP), or any combination thereof. The one or more processors 410 may include one or more levels of caching, such as a level one cache 411 and a level two cache 412, a processor core 413, and registers 414. The processor core 413 can include an arithmetic logic unit (ALU), a floating point unit (FPU), a digital signal processing core (DSP Core), or any combination thereof. A memory controller 415 can also be used with the one or more processors 410, or in some implementations the memory controller 415 can be an internal part of the processor 410.

Depending on the particular configuration, the system memory 420 may be of any type including but not limited to volatile memory (such as RAM), non-volatile memory (such as ROM, flash memory, etc.) or any combination thereof. The system memory 420 may include an operating system 421, one or more applications 422, and program data 424. The one or more applications 422 may include a quorum detection module application and/or a licensing queue application 423 that can be arranged to perform the functions, actions, and/or operations as described herein including the functional blocks, actions, and/or operations described herein. The program data 424 may include licensing, message, and/or authorization data 425 for use with the quorum detection module application and/or the licensing queue application 423. In some example embodiments, the one or more applications 422 may be arranged to operate with the program data 424 on the operating system 421. This described basic configuration 401 is illustrated in FIG. 4 by those components within dashed line.

The computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The one or more data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 420, the removable storage 451 and the non-removable storage 452 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 442 for facilitating communication from various interface devices (e.g., output interfaces, peripheral interfaces, and communication interfaces) to the basic configuration 401 via the bus/interface controller 440. Example output interfaces 460 may include a graphics processing unit 461 and an audio processing unit 462, which may be configured to communicate to various external devices such as a display or speakers via one or more NV ports 463. Example peripheral interfaces 470 may include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication interface 480 includes a network controller 481, which may be arranged to facilitate communications with one or more other computing devices 483 over a network communication via one or more communication ports 482. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 400 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 400 may also be implemented as a personal computer including both laptop computer and non-laptop computer configurations. In addition, the computing device 400 may be implemented as part of a wireless base station or other wireless system or device.

The various embodiments of the computing device 400 described above may be used to implement one or more of the computing devices 102, 120, 130, 140, and/or 150 described above. For example, the computing device 400 may be used to implement the computing device 102. Accordingly, the licensing queue 110 (including the messages 112) may be stored and maintained in the system memory 420. As another example, the computing device 400 may be used to implement one or more of the computing devices 120, 130, 140, and/or 150. Accordingly, one or more of the software application instances (including the quorum detection modules) may be stored and maintained in the system memory 420.

Some portions of the foregoing detailed description are presented in terms of algorithms or symbolic representations of operations on data bits or binary digital signals stored within a computing system memory, such as a computer memory. An algorithm is here, and generally, considered to be a self-consistent sequence of operations or similar processing leading to a particular result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware is possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

The devices and/or processes are described in the manner set forth herein, and thereafter engineering practices may be used to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The subject matter described herein sometimes illustrates different components contained within, or connected with, different other components. Such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, the terms may be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense generally understood for the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense generally understood for the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Additionally, all of the above also applies with respect to the various usages of the terms "embodiment" or "embodiments."

While certain exemplary techniques have been described and shown herein using various methods and systems, various other modifications may be made, and equivalents may be substituted. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is/are:

1. A method to manage licensing of a software program, the method comprising:
    querying, by an instance of the software program running on a computing device, a licensing queue for messages;
    receiving, by the instance of the software program, a result based at least in part on the querying of the licensing queue;
    determining, by the instance of the software program, a number of active instances of the software program based at least in part on the received result;
    determining, by the instance of the software program, whether the instance of the software program is authorized based at least in part on the determined number of active instances;
    generating, by the instance of the software program, a unique instance identification tag in response to a determination that the instance of the software program is authorized;
    posting, by the instance of the software program, a message to the licensing queue, in response to the determination that the instance of the software program is authorized, the message including an indication that the instance of the software program is active and an indication of the generated unique instance identification tag; and
    archiving, by the instance of the software program, the message posted to the licensing queue to determine billing for actual usage of the software program, wherein the licensing queue is associated with a vendor for the software program corresponding to the instance, and the vendor is enabled to observe and record usage of the software program by querying archived messages.

2. The method of claim 1, further comprising:
    terminating execution of the instance of the software program, by the instance of the software program, in response to a determination by the instance of the software program that the instance of the software program is unauthorized.

3. The method of claim 1, further comprising:
    re-querying, by the instance of the software program, the licensing queue for messages at a particular time interval;
    receiving, by the instance of the software program, an additional result based at least in part on the re-querying of the licensing queue;
    updating, by the instance of the software program, the determined number of active instances of the software program based at least in part on the received additional result;
    updating, by the instance of the software program, the determination of whether the instance of the software program is authorized based at least in part on the updated determined number of active instances; and
    posting, by the instance of the software program, an additional message to the licensing queue, in response to a determination that the instance of the software program is authorized, the additional message including an indication that the instance of the software program is active and an indication of the generated unique instance identification tag.

4. The method of claim 1, wherein the determining, by the instance of the software program, whether the instance of the software program is authorized based at least in part on the determined number of active instances includes:
    determining a maximum number of allowed instances of the software program; and
    comparing the determined maximum number of allowed instances of the software program to the determined number of active instances of the software program.

5. The method of claim 4, wherein the determining, by the instance of the software program, whether the instance of the software program is authorized based at least in part on the determined number of active instances further includes:
    determining that the instance of the software program is authorized in response to a determination that the determined number of active instances of the software program is less than the determined maximum number of allowed instances of the software program.

6. The method of claim 1, wherein the received result includes an indication that there are one or more messages in the licensing queue and wherein the determining, by the instance of the software program, the number of active instances of the software program based at least in part on the received result includes:

receiving, by the instance of the software program, the one or more messages from the licensing queue, the one or more messages each including an indication of an instance identification tag;

counting, by the instance of the software program, a number of unique instance identification tags based at least in part on the received one or more messages; and determining, by the instance of the software program, the number of active instance of the software program based at least in part on the counted number of unique identification tags.

7. The method of claim 1, wherein the querying, by the instance of the software program, the licensing queue for messages includes:

determining, by the instance of the software program, whether the licensing queue exists; and establishing, by instance of the software program, the licensing queue in response to a determination that the licensing queue does not exist.

8. The method of claim 1, wherein the instance of the software program is executed on a virtual machine running on the computing device.

9. A machine readable non-transitory medium with instructions stored thereon that, when executed by one or more processors, operatively enable a quorum detection module of an instance of a software program to:

query a licensing queue corresponding to the software program for messages;

determine a number of active instances of the software program based at least in part on a result that is received in response to the query;

determine whether the instance of the software program is authorized based at least in part on the determined number of active instances;

generate a unique instance identification tag in response to a determination that the instance of the software program is authorized;

post a message to the licensing queue, in response to the determination that the instance of the software program is authorized, the message including an indication that the instance of the software program is active and an indication of the generated unique instance identification tag; and archive the message Posted to the licensing queue to determine billing for actual usage of the software program, wherein the licensing queue is associated with a vendor for the software program corresponding to the instance, and the vendor is enabled to observe and record usage of the software program by querying archived messages.

10. The machine readable non-transitory medium of claim 9, wherein the stored instructions that, when executed by one or more processors, further operatively enable the quorum detection module to:

determine a maximum number of allowed instances of the software program; and compare the determined maximum number of allowed instances of the software program to the determined number of active instances of the software program.

11. The machine readable non-transitory medium of claim 10, wherein the stored instructions that, when executed by one or more processors, further operatively enable the quorum detection module to:

authorize the instance of the software program in response to a determination that the determined number of active instances of the software program is less than the determined maximum number of allowed instances of the software program.

12. The machine readable non-transitory medium of claim 9, wherein the result includes an indication that there are one or more messages in the licensing queue and wherein the stored instructions that, when executed by one or more processors, further operatively enable the quorum detection module to:

read the one or more messages from the licensing queue, the one or more messages each including an indication of an instance identification tag;

count a number of unique instance identification tags based at least in part on the read one or more messages; and determine the number of active instance of the software program based at least in part on the counted number of unique identification tags.

13. The machine readable non-transitory medium of claim 9, wherein the stored instructions that, when executed by one or more processors, further operatively enable the quorum detection module to:

determine whether the licensing queue exists; and establish the licensing queue in response to a determination that the licensing queue does not exist.

14. The machine readable non-transitory medium of claim 9, wherein the stored instructions that, when executed by one or more processors, further operatively enable the quorum detection module to:

query the licensing queue for unread messages received within a selected time interval.

15. An apparatus comprising:

a hardware storage device;

an instance of a software program;

a licensing queue corresponding to the software program and stored in the hardware storage device; and a quorum detection module coupled to the software program, the quorum detection module operatively enabled to:

query a licensing queue for messages;

determine a number of active instances of the software program based at least in part on a result of the query;

determine whether the instance of the software program is authorized based at least in part on the determined number of active instances;

generate a unique instance identification tag in response to a determination that the instance of the software program is authorized;

post a message to the licensing queue, in response to the determination that the instance of the software program is authorized, the message including an indication that the instance of the software program is active and an indication of the generated unique instance identification tag; and archive the message posted to the licensing queue to determine billing for actual usage of the software program, wherein the licensing queue is associated with a vendor for the software program corresponding to the instance, and the vendor is enabled to observe and record usage of the software program by querying archived messages.

16. The apparatus of claim 15, wherein the quorum detection module is further operatively enabled to:

determine a maximum number of allowed instances of the software program; and compare the determined maximum number of allowed instances of the software program to the determined number of active instances of the software program.

17. The apparatus of claim 16, wherein the quorum detection module is further operatively enabled to:
determine that the instance of the software program is authorized in response to a determination that the determined number of active instances of the software program is less than the determined maximum number of allowed instances of the software program.

18. The apparatus of claim 15, wherein the result includes an indication that there are one or more messages in the licensing queue and wherein the quorum detection module is further operatively enabled to:
read the one or more messages from the licensing queue, the one or more messages each including an indication of an instance identification tag;
count a number of unique instance identification tags based at least in part on the read one or more messages; and
determine the number of active instance of the software program based at least in part on the counted number of unique identification tags.

19. The apparatus of claim 15, wherein the quorum detection module is further operatively enabled to:
determine whether the licensing queue exists; and
establish the licensing queue in response to a determination that the licensing queue does not exist.

20. The apparatus of claim 15, wherein the quorum detection module is further operatively enabled to:
query the licensing queue for unread messages received within a particular time interval.

\* \* \* \* \*

UNITED STATES PATENT AND TRADEMARK OFFICE
CERTIFICATE OF CORRECTION

| | | |
|---|---|---|
| PATENT NO. | : 9,436,814 B2 | Page 1 of 1 |
| APPLICATION NO. | : 14/426157 | |
| DATED | : September 6, 2016 | |
| INVENTOR(S) | : Kruglick | |

It is certified that error appears in the above-identified patent and that said Letters Patent is hereby corrected as shown below:

On the Title Page

In Item (56), under "U.S. PATENTS DOCUMENTS", in Column 1, Line 2, delete "Hoover" and insert -- Fucarile --, therefor.

On Page 2, in Item (56), under "OTHER PUBLICATIONS", in Column 1, Line 1, delete "Lcensing: Lcensing for Virual Envronments," accessed" and insert -- Licensing: Licensing for Virtual Environments," accessed --, therefor.

On Page 2, in Item (56), under "OTHER PUBLICATIONS", in Column 2, Line 48, delete "Executon of "Legacy" Java Sofware," ECOOP" and insert -- Execution of "Legacy" Java Software," ECOOP --, therefor.

On Page 2, in Item (56), under "OTHER PUBLICATIONS", in Column 2, Line 53, delete "posted an" and insert -- posted on --, therefor.

In the Specification

In Column 1, Line 8, delete "U.S.C §371" and insert -- U.S.C. § 371 --, therefor.

In Column 13, Line 40, delete "NV ports" and insert -- A/V ports --, therefor.

In the Claims

In Column 19, Line 46, in Claim 9, delete "Posted" and insert -- posted --, therefor.

Signed and Sealed this
Twenty-eighth Day of February, 2017

Michelle K. Lee
*Director of the United States Patent and Trademark Office*